(12) United States Patent
Kumkar et al.

(10) Patent No.: US 8,787,716 B2
(45) Date of Patent: Jul. 22, 2014

(54) FIBRE COUPLER

(75) Inventors: Malte Kumkar, Weimar (DE); Marcin Michal Kozak, Rothenstein/Oelkintz (DE); Clemens Hoenninger, Cestas (FR); Andreas Liem, Jena (DE); Thomas Gabler, Rothenstein/Oelknitz (DE); Inka Manek-Hoenninger, Cestas (FR)

(73) Assignees: TRUMPF Laser GmbH + Co. KG, Schramberg (DE); JENOPTIK Laser GmbH, Jena (DE)

( * ) Notice: Subject to any disclaimer, the term of this patent is extended or adjusted under 35 U.S.C. 154(b) by 915 days.

(21) Appl. No.: 12/989,648

(22) PCT Filed: Apr. 9, 2009

(86) PCT No.: PCT/DE2009/000500
§ 371 (c)(1),
(2), (4) Date: Dec. 12, 2010

(87) PCT Pub. No.: WO2009/129774
PCT Pub. Date: Oct. 29, 2009

(65) Prior Publication Data
US 2011/0123155 A1    May 26, 2011

(30) Foreign Application Priority Data
Apr. 25, 2008  (DE) .......................... 10 2008 020 828

(51) Int. Cl.
*G02B 6/26* (2006.01)
*G02B 6/42* (2006.01)

(52) U.S. Cl.
USPC ................................. 385/43; 385/15; 385/31

(58) Field of Classification Search
USPC .......................................... 385/15, 31, 42, 43
See application file for complete search history.

(56) References Cited

U.S. PATENT DOCUMENTS

| | | | |
|---|---|---|---|
| 4,497,643 | A | 2/1985 | Kowata et al. |
| 5,017,206 | A | 5/1991 | Miller et al. |
| 5,268,979 | A | 12/1993 | Weidman |
| 5,339,372 | A | 8/1994 | Miller et al. |
| 6,434,302 | B1 | 8/2002 | Fidric et al. |
| 7,016,573 | B2 | 3/2006 | Dong et al. |
| 7,272,956 | B1 | 9/2007 | Anikitchev |

FOREIGN PATENT DOCUMENTS

| | | |
|---|---|---|
| EP | 0 592 822 A1 | 4/1994 |
| EP | 1 862 830 A2 | 12/2007 |
| GB | 2 439 345 A | 12/2007 |
| WO | WO 2005/091029 | 9/2005 |
| WO | WO 2007/148139 | 12/2007 |

OTHER PUBLICATIONS

English translation of the International Search Report and Written Opinion for PCT/DE2009/000500, Nov. 9, 2010, 18 pages.

*Primary Examiner* — Charlie Peng
*Assistant Examiner* — Mary El Shammaa
(74) *Attorney, Agent, or Firm* — Skaar Ulbrich Macari, P.A.

(57) ABSTRACT

A fiber coupler with an inner tube, an inner fiber arranged within the inner tube and several outer fibers arranged around the inner fiber, is disclosed, wherein said fiber coupler tapers in the longitudinal direction of the inner fiber from a main section to a terminal section and the inner cross section on the inner tube corresponds to the diameter of the inner fiber along the tapering section of the fiber coupler.

22 Claims, 14 Drawing Sheets

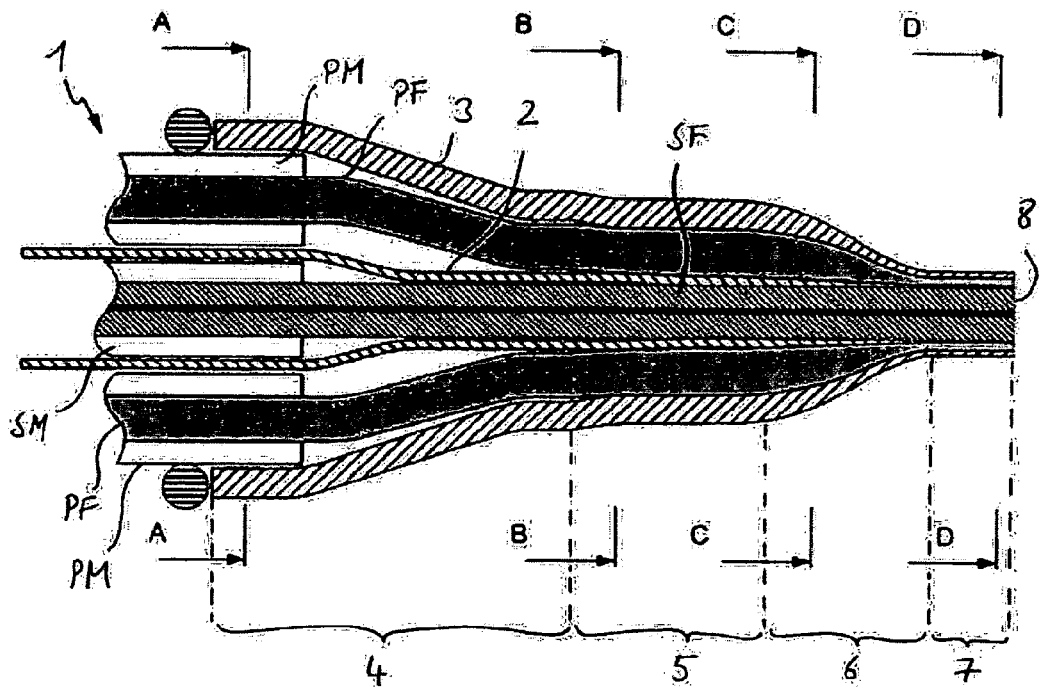
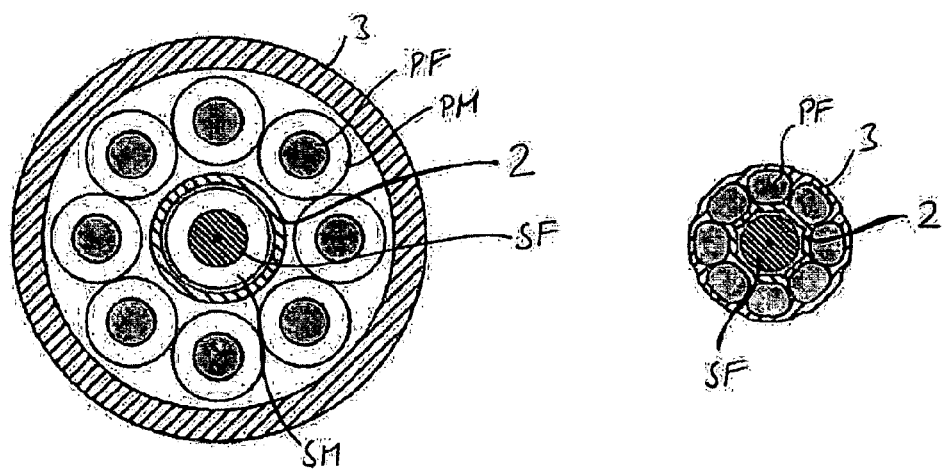
Fig. 1
Fig. 2
Fig. 3

FIBRE COUPLER

PRIORITY

This application claims the benefit of International Application PCT/DE2009/000500, filed on Apr. 9, 2009, and German Patent Application No. 102008020828.0, filed on Apr. 25, 2008, both of which are hereby incorporated by reference herein.

The present invention relates to a fiber coupler.

FIELD

Background

Such a fiber coupler is used, for example, for the optical pumping of a fiber laser or fiber amplifier, in order to couple pump light via pump fibers into the pump core of a signal fiber which conducts signal light.

Such couplers are used, for example, in connection with cladding-pumped fiber lasers. For these, it is desirable to couple pump light into the pump cladding of the double core fiber (=active fiber) in such a manner that the light is conducted in the pump cladding and is absorbed in the active signal core of the double core fiber. Good absorption of the pump light is achieved with smaller cross-sectional area of the pump cladding, good conduction is achieved if the divergence of the pump light does not exceed the acceptance angle of the double core fiber.

On the one hand, conducting light from the pump or external fibers as efficiently as possible is fundamental for such a coupler. On the other hand, signal light is to be able to be conducted in both directions through the coupler with as little interference as possible.

For example, a tapering fiber bundle is known from U.S. Pat. No. 6,434,302, in which the pump fibers are pre-tapered and then fused with the signal fiber, which is optionally tapered by etching. It is disadvantageous in this case that the signal fiber must be strongly heated for the fusion and/or the fusion does not result in a structure which can be broken and spliced well.

In the U.S. Pat. No. 7,016,573 B2, the tapering of the fiber coupler is achieved by the tapering of a signal fiber, which disadvantageously influences the conduction property of the signal fiber, whereby the maximum power of a laser having this coupler is reduced, for example.

SUMMARY

Proceeding therefrom, it is the object of the invention to provide an improved fiber coupler.

The object is achieved by a fiber coupler having an inner tube, an inner fiber situated in the inner tube, and multiple outer fibers situated around the inner fiber, the fiber coupler tapering in the longitudinal direction of the inner fiber, from a main section to a terminal section, and the internal cross-section of the inner tube along the tapering section of the fiber coupler corresponding to the cross-section of the inner fiber.

Through the provision of the inner tube, it is possible to leave the cross-section of the inner fiber unchanged and to implement the desired tapered section simultaneously. Furthermore, through the provision of the inner tube, the inner fiber can be subjected to a comparatively slight thermal load in the production process of the fiber coupler. Overall, this promotes undisturbed signal conduction through the fiber coupler according to the invention.

Undisturbed signal conduction particularly means here that the losses are kept as low as possible, and the mode distribution is maintained.

Furthermore, in the fiber coupler according to the invention, the outer fibers can efficiently conduct the light, in particular through the tapering section and the terminal section. Efficient conduction of the light by the outer fibers through the fiber coupler in particular means here that the light is conducted with low loss up to the terminal section, and the brilliance is maintained as well as possible. The best possible brilliance is achieved in this case if the light supplied by the outer fibers is conducted through a terminal section of the smallest possible area having the least possible divergence.

The provision of the inner tube also provides advantages during the production of the fiber coupler. No direct contact is thus required between outer fibers and inner fibers, because the required optical contact occurs via the inner tube. Therefore, during the production of the fiber coupler, the implementation of the tapering section and the contacting of outer fibers and inner tube can be performed without inserted inner fiber, for example, so that worsening of properties of the inner fibers does not occur during these production steps. After the tapering section and the contact between outer fibers and inner tube have been produced, the inner fiber can be inserted, so that the introduction of heat into the inner fiber can be minimized during the production of the fiber coupler.

In typical solutions, up to this point a direct contact was generated between outer fibers and inner fiber. This can result, on the one hand, in an undesired high introduction of heat into the inner fiber. On the other hand, the selection of the inner fiber is very restricted.

In the fiber coupler according to the invention, this restriction does not exist, since, as explained, the introduction of heat into the inner fiber can be minimized.

Furthermore, in the fiber coupler according to the invention, overcoupling of the light from the outer fibers into the inner fiber is made possible in the tapering section or tapered region. This overcoupling is more favorable through the optical contact between inner fiber and inner tube, on the one hand, and, for example, upon complete fusion of the outer fibers with the inner tube, on the other hand, with respect to the brilliance of the pump light achieved in the terminal section than known solutions, in which the pump light fibers are individually tapered. Any divergence increased by tapering of a structure without optical contact to the inner fiber restricts the achievable brilliance of the pump light in the terminal section in relation to the solution according to the invention.

The tapering section or tapered section can particularly be implemented so that light conducted through the outer fibers from the main section to the terminal section does not exceed a specified (permissible) divergence. The cross-sectional area of the terminal section is preferably as small as possible.

The main section can be characterized in that, for example, the cross-sectional shape of the outer fibers remains substantially constant along the main section. In other words, the main section can be implemented so that the divergence of the light conducted in the outer fibers is not increased or is not substantially increased.

The terminal section can have a different extension in the longitudinal direction of the fiber coupler according to the invention. This extension can also be 0 in the extreme case. In this case, the terminal section is the end of the tapered section.

If the extension of the terminal section is not equal to 0 in the longitudinal direction, the terminal section can be characterized in particular in that the cross-sectional shape of the outer fibers no longer changes along the terminal section. In particular, the outer fibers may be in direct optical contact with the inner tube along the terminal section. The outer fibers may thus be fused with the inner tube, for example.

Furthermore, the tapered section and the terminal section preferably have no air inclusions between the outer fibers and the inner tube and between the inner tube and the inner fiber.

The fiber coupler can be used for the purpose of coupling light from the outer fibers into the inner fiber or coupling light from the inner fiber into the outer fibers. In particular, it is used for optical pumping of a fiber laser or fiber amplifier. In this case, the outer fibers may be referred to as pump fibers, which couple pump light into the inner fiber, which can then be referred to as the signal fiber.

The inner fiber is preferably a double-core or triple-core fiber, while it can also contain more than three cores. It can be doped using laser-active ions, in order to use it as an amplifier fiber/laser fiber, or it can also be used passively as a transport fiber. Furthermore, the inner fiber can be implemented as polarization-maintaining or polarizing and/or as an LMA fiber (large mode area fiber) with or without air inclusions.

The cross-section of the inner and outer fibers can be circular, oval, or also polygonal (for example, rectangular, hexagonal, octagonal) or shaped differently.

In the fiber coupler according to the invention, the outer fibers may extend parallel to one another along the longitudinal direction of the inner fiber. Twisting of the outer fibers along the longitudinal direction is not necessary, but is possible.

In the fiber coupler according to the invention, because of the tapering section, the beam quality (e.g., brilliance, power, and/or divergence of the light conducted in the outer fibers and/or in the inner fiber) is advantageously optimally maintained, the signal conduction in the inner fiber only being minimally influenced by the lateral coupling in the area of the tapering section of the outer fibers on the inner fiber.

In the fiber coupler according to the invention, the internal cross-section of the inner tube can remain equal along the tapering section. However, it is also possible that it decreases. It is essential in particular that the internal cross-section of the inner tube of the tapering section is equal to the cross-section of the inner fiber.

Furthermore, the inner tube can be collapsed along the tapering section on the inner fiber and/or fused therewith. This is advantageous in that the inner tube can be used as a support structure for the outer fiber during the production of the tapered section and is a component of the fiber coupler in the finished fiber coupler.

The outer fibers may extend along the entire tapering section, whereby their radial extension tapers accordingly.

The outer fibers may be in optical contact with the inner fiber via the inner tube along the tapering section. If the outer fibers extend along the entire tapering section, they may be in direct optical contact with the inner tube along the entire tapering section. Without such a contact along the tapering section, such a high brilliance cannot be achieved in the terminal section as with this contact, and the reduction of the brilliance provided from the outer fibers would be increased.

The fiber coupler according to the invention can further have an outer tube, in which the inner tube is situated at least partially (viewed in the longitudinal direction of the inner tube) and in which the outer fibers at least partially extend (viewed in the longitudinal direction of the outer fibers).

In particular, the outer fibers may extend between outer tube and inner tube.

It is also possible that the outer fibers extend up to the tapering section, are optically coupled to a front side of the inner tube (e.g., by direct contact of terminal face of the outer fibers with the front side of the inner tube), and the wall thickness of the inner tube decreases along the tapering section.

Furthermore, in the fiber coupler according to the invention, the wall thickness of the outer tube can decrease along the tapering section.

Moreover, it is possible that the outer tube extends along the entire tapering section.

The outer tube and the inner tube can be implemented together in one piece by holes in a carrier. However, it is also possible to implement outer and inner tubes in two pieces by corresponding holes in two partial carriers, for example. Of course, it is also possible to implement outer and inner tubes from more than two partial carriers. The division into partial carriers is preferably provided in the longitudinal direction of the fiber coupler.

If outer and inner tubes are implemented in multiple pieces, it is preferable that these multi-piece parts are fixedly and permanently connected to one another in the finished fiber coupler (for example, fused with one another).

Furthermore, a method for producing a fiber coupler is proposed, which has the following steps:
a) creating a blank, which comprises an inner tube and multiple outer fibers pressing around the inner tube and/or against the front side of the inner tube and which is tapered along the longitudinal direction of the inner tube in such a manner that it has a tapered section, which connects a main section of the blank to a terminal section of the blank, wherein a provision step, using which the multiple outer fibers are provided, and a tapering step, using which the tapering section is formed, are performed to create the blank, and
b) inserting an inner fiber into the inner tube, wherein after the tapering step, the internal cross-section of the inner tube along the tapered section corresponding to the cross-section of the inserted inner fiber.

In this method, the cross-section of the inner fiber is advantageously not changed, so that the produced fiber coupler can provide a coupling in which the quality of the inner fiber is not worsened.

Furthermore, it is possible to perform the tapering step before step b). In this case, it is possible to either leave the internal cross-section of the inner tube unchanged in the tapering step or to change it. If it is changed, it is changed so that after the tapering it corresponds to the cross-section of the inner fiber to be inserted, so that the inner fiber can just be inserted into the inner tube.

Before the tapering step, the outer fibers (at least partially, for example, in the tapered section to be formed thereafter) may be fused with the inner tube. Undesired air inclusions may thus be prevented, for example.

Step b) can be executed before the tapering step. In this case, the tapering is preferably performed so that no cross-sectional change of the inserted inner fiber occurs.

If the production method is executed as a continuous method, in which the inner fiber is already inserted into the inner tube before the tapering, the tapering of the blank and, simultaneously trailing, a collapse of the inner tube on the signal fiber (for example, together with fusion of both) can be performed. The collapsing thus spatially trails the tapering step.

Furthermore, in the method, after the tapering step and step b), the inner tube can be collapsed along the tapered section on the inner fiber. A good optical contact is thus achieved between outer and inner fibers. In particular, the inner tube can be fused with the inner fiber along the collapsed section. Furthermore, partial vacuum can be used during the collapsing.

Furthermore, in the method in step a), the outer fibers can be inserted between the inner tube and an outer tube, which at least partially encloses it in the longitudinal direction. A blank is thus provided in which the tapered section can be formed easily in the tapering step, for example, by mechanical drawing of the outer tube and the outer fibers.

In the method according to the invention, the outer tube used in step a) can have a closed internal cross-section for receiving the inner fiber in the area of the tapered section to be created in the tapering step. The closed internal cross-section can be provided not only in the area of the tapered section, but rather also in the area of the terminal section of the blank and thus of the fiber coupler then produced. Furthermore, it is possible that the employed inner tube also has a closed cross-section for receiving the inner fiber in the area of the tapered section to be created in the tapering step. The closed section can also be provided in the inner tube both in the tapered section and also in the terminal section of the blank and thus of the fiber coupler then produced. Through the closed implementation of outer and/or inner tubes it is possible to apply overpressure or partial vacuum in a targeted manner during the production, in order to improve the production of the fiber coupler.

In the method according to the invention, outer fibers may further be used in the provision step, which are already tapered in the area of the tapered section to be created in the tapering step. It is thus no longer necessary, for example, to taper the outer fibers in the tapering step. Alternatively, it is possible to only still slightly taper the outer fibers in the tapering step, whereby the production step is simplified.

The outer fibers may be preprocessed before step a). This relates, for example, to the above-mentioned tapering of the outer fibers. It is also possible to splice the outer fiber with a supply fiber, or to provide mode stripper, an integratable mode field adapter, an integrated filter, etc.

The inner fiber can also be preprocessed before the insertion in step b). This preprocessing can comprise, for example, a mode field adaptation, a tapering, an integration of mode filters or spectral filters, the production of a mode filter, and/or the splicing of multiple fiber pieces.

Furthermore, the method can comprise (preferably before the tapering step and step b)) a step of implementation of a receptacle section (for example, by inflation), in which the outer fibers and/or the inner fiber are received and also supported.

Furthermore, it is possible to encapsulate or temporarily seal the inner tube and/or the outer tube during the production method, in order to be able to build up desired pressure differences.

The tapering of the blank in the tapering step can be caused by material deformation and/or material removal. This applies to the pump fibers and, if an outer tube is provided, also for the outer tube.

In the method, the wall thickness of the inner tube can be reduced in the tapering step.

It is possible to perform the provision step before the tapering step, in order to execute step a). In this case, it is preferable that the outer fibers are tapered by the tapering step so that the cross-sectional areas of the outer fibers decrease in the tapered section in the direction of the tapering.

Of course, it is also possible to execute the tapering step before the provision step. In this case, appropriately adapted outer fibers are preferably situated, which may already be tapered, if they extend up into the tapered section.

In the provision step, the outer fibers are preferably situated so that they run parallel to one another.

The provision of the outer tube can be performed in that a carrier is provided, which has a middle hole for the inner fiber and multiple outer holes, surrounding the middle hole, for the outer fibers. The carrier can be in one piece. However, it is also possible to implement the carrier in two pieces. In this case, an inner part, which has the middle hole, and an outer part are preferably provided. The outer holes may preferably be implemented by the inner and outer parts in the assembled state.

The inner and outer fibers are preferably inserted without cladding into the fiber coupler. In particular, both the inner fiber and also the outer fibers are not clad in the tapering section or tapered section. The outer tube can be produced from a material having a low index of refraction.

The inner and outer holes are preferably executed so that the inner and outer fibers are received in a formfitting manner. It is especially advantageous in particular if at least the inner fiber is received in a formfitting manner.

If an outer tube is used, an inner tube divided in the longitudinal direction can be used. This makes it possible that the fiber coupler according to the invention can be implemented not only at the end of an inner fiber, but rather in a middle section without cladding.

It is obvious that the above-mentioned features and the features to be explained hereafter are usable not only in the specified combinations, but rather also in other combinations or alone, without leaving the scope of the present invention.

BRIEF DESCRIPTION OF THE FIGURES

The invention is explained in greater detail for exemplary purposes hereafter on the basis of the appended drawings, which also disclose features essential to the invention. In the figures:

FIG. 1 shows a fiber coupler according to a first embodiment;
FIG. 2 shows the cross-section along line A-A of FIG. 1;
FIG. 3 shows the cross-section along line B-B of FIG. 1.

DETAILED DESCRIPTION

Figure 4:
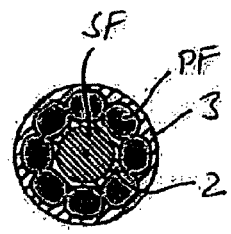
FIG. 4 shows the cross-section along line C-C of FIG. 1.
Figure 5:
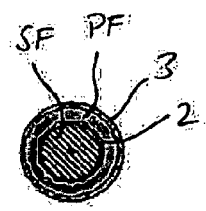
FIG. 5 shows the cross-section along line D-D of FIG. 1.

In the embodiment shown in FIGS. 1 through 5, the fiber coupler 1 according to the invention comprises an inner tube 2 having circular cross-section, in which a signal fiber SF, which is implemented here as a double core fiber, is inserted. The inner tube 2 is seated centrally in an outer tube 3 and eight pump fibers PF, which extend in the longitudinal direction of the signal fiber SF, are situated between the inner and outer tubes 2, 3. The inner tube 2 supports the pump fibers PF and therefore can also be referred to as a support tube.

The fiber coupler 1 is implemented so that, in the illustration of FIG. 1 from left to right, it has a tapering receptacle section 4, a main section 5, a tapered section 6, and a terminal section 7 having essentially constant external diameter.

The inner tube 2 has an essentially constant internal cross-section over its entire length (within the outer tube 3) up to its expansion on the left side in FIG. 1 to receive the signal fiber SF with cladding SM. In order to implement the tapering formation of the fiber coupler 1, the pump fibers PF and the outer tube 2 taper in the tapered section 6. The wall thickness of the inner tube 2 also becomes less along the tapered section 6.

The tapered section 6 is characterized in particular in that the external diameter of the outer tube 3 decreases in the longitudinal direction of the fiber coupler 1. Furthermore, the entire area of the inner side of the inner tube 2 along the tapered section 6 presses against the signal fiber SF so that there is a direct optical contact. Air inclusions are not to exist along the tapered section between the inner tube 2 and the signal fiber SF, as can also be inferred from the cross-sectional view in FIG. 4, for example. In the embodiment described here, the inner tube 2 is fused with the signal fiber SF along the tapered section 6.

The length of the tapered section 6 is selected here so that the increase of the divergence in the tapered section 6 occurs successively over the length in order to avoid excessively strong divergence increase or even performance losses.

In addition, there are no air inclusions along the tapered section 6 between the inner tube 2 on one side and the pump fibers PF on the other side, so that a direct optical contact exists between the pump fibers PF and the inner tube 2 and thus also with the signal fiber SF. In the exemplary embodiment described here, the pump fibers PF are fused with the inner tube 2 along the tapered section 6.

Furthermore, there are also no air inclusions between the pump fibers PF on one side and the outer tube 3 along the tapered section 6.

The left open end of the outer tube 2 has an internal diameter which is selected so that there is just enough space between inner and outer tubes 2, 3 to be able to insert pump fibers PF having their cladding PM. As is obvious from the cross-sectional view of FIG. 2, eight pump fibers PF are equally distributed in the peripheral direction around the inner tube 2 and the signal fiber SF.

The cladding PM only extends up to the tapering area of the receptacle section 4 and from there the pump fibers PF no longer have cladding PM. The internal diameter of the outer tube 3 at the transition from the receptacle section 4 to the main section 5 is therefore selected so that the spacing between the signal fiber SF and the inner wall of the outer tube 3 is slightly greater in the radial direction than the diameter of the pump fibers PF.

Along the main section 5 in the direction toward the tapered section 6, a slight deformation of the pump fibers PF and the outer tube 3 already occurs, in order to reduce the undesired air inclusions. As may be inferred in particular from the view in FIG. 1 and the cross-sectional view in FIG. 3, the pump fibers PF already press against the inner tube 2. The cross-sectional shape of the pump fibers PF is no longer circular, but rather already slightly deviates from the circular shape (FIG. 3). The external diameter of the outer tube 3 is essentially constant along the main section 5. The main section 5 is preferably implemented so that the divergence of the (pump) light conducted in the pump fibers PF is not increased or is not substantially increased. However, the light can also pass partially in the main section 5 from the pump fibers PF into the remaining pump fibers PF, the signal fibers SF, or the outer tube 3.

In the tapered section 6 of the fiber coupler 1 adjoining the main section 5, the external diameter of the fiber coupler 1 and thus of the outer tube 3 decreases from left to right in FIG. 1, while in contrast the internal diameter of the inner tube 2 remains equal along the entire tapered section 6. In order to achieve this, on the one hand, the wall thickness of the outer tube 3 decreases in the tapered section 6. Furthermore, in the same way, the radial extension of the pump fibers PF is reduced and their cross-sectional area decreases. This is accompanied with the change of the cross-sectional shape of the pump fibers PF. The cross-sectional shape of the pump fibers PF decreases from the cross-section (FIG. 4) slightly deviating from the circular shape at the beginning of the tapered section 6 to a cross-section which can be referred to as a circular ring section, so that in the adjoining terminal section 7, the pump fibers PF together form a circular ring (closed per se), as schematically shown in the sectional view of FIG. 5.

In other words, the shape of the pump fibers PF will result so that they completely fill up the space between outer tube 3 and inner tube 2, the pump fibers PF tapering more and more in the direction of the terminal section 7 and lying more closely around the inner tube 2.

In the embodiment described here, the terminal section 7 is distinguished in that in the longitudinal direction (i.e., from left to right in FIG. 1), the dimensions of inner tube 2, outer tube 3, signal fiber SF, and pump fibers PF no longer change in cross-section. Furthermore, along the terminal section 7, the inner tube 2 presses over its entire inner side against the signal fiber SF, so that a direct optical contact exists. The inner tube 2 is also fused with the signal fiber SF in the terminal section 7 in the same way as in the tapered section 6. Furthermore, the pump fibers PF press directly against the inner tube 2 and the outer tube 3 presses directly against the pump fibers PF. Air inclusions also no longer exist in the terminal section. A fiber (not shown) can be spliced onto the front end 8 of the terminal section 7.

In the fiber coupler of FIG. 1, the pump fibers PF thus press against the inner tube 2 along the entire tapered section 6, so that light conducted in the pump fibers PF can be (partially) overcoupled into the signal fiber SF, in which the light is conducted further. Furthermore, the pump fibers PF, each viewed in cross-section, are distributed uniformly around the signal fiber SF in the peripheral direction along the entire tapered section 6, so that effective overcoupling is possible.

The inner tube 2 can be collapsed by heat action on the signal fiber SF and/or fused therewith, so that outstanding optical coupling is provided between pump fibers PF, which press against the inner tube 2, and the signal fiber SF.

A possible production of the fiber coupler of FIG. 1 is described in connection with FIGS. 6 through 9.

Firstly, the inner tube 2 having circular cross-section is situated centrally in the outer tube 3, which also has a circular cross-section. The eight pump fibers PF are inserted distributed uniformly in the peripheral direction between the inner and outer tubes 2, 3 (FIG. 6), so that a fiber coupler blank 1' is provided. In order that the internal diameter of the inner tube 3 is not reduced, pressure is applied to the inner tube, as indicated by the arrow P1.

Figure 6:
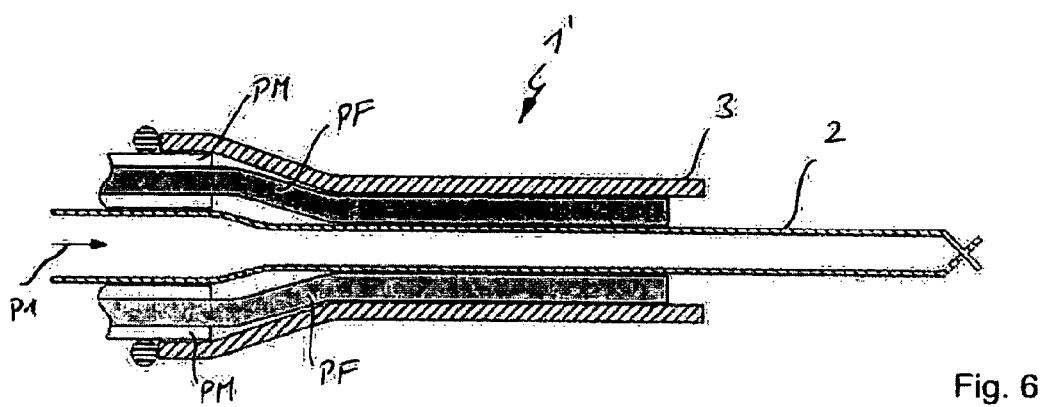
FIG. 6-9 show steps for the production of the fiber coupler of FIG. 1.
Figure 7:
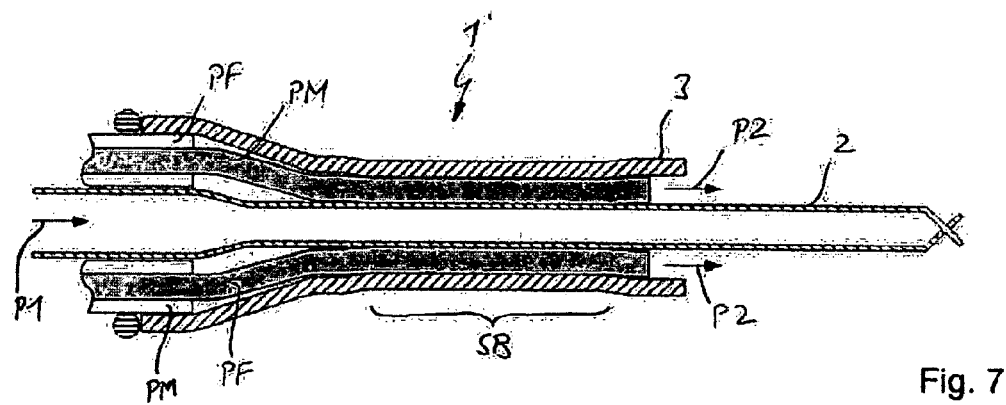

In the step from FIG. 6 to FIG. 7, the outer tube 3 is fused with the pump fibers PF in the area SB.

The outer tube 3 and the pump fibers PF are then tapered by mechanical drawing (indicated by arrows P2) while heating in a middle section MA of the blank 1' (the extension in the radial direction is reduced). The fiber coupler blank 1' thus has a tapered middle section MA. During the tapering of the outer tube 3 and the pump fibers PF, pressure is applied to the inner tube (arrow P1). The pressure is selected as a function of the mechanical drawing and the heating so that the free cross-section of the inner tube 2 after the drawing exactly corresponds to the cross-section of the signal fiber SF to be inserted or is somewhat larger, so that the signal fiber SF is insertable.

This is preferably achieved in that the entire inner tube 2 or at least the free internal cross-section of the inner tube 2 is not deformed during the drawing. Of course, it is also possible to permit a shape change, it then being ensured that the inner tube 2 has the desired free internal cross-section after the drawing.

Figure 8:
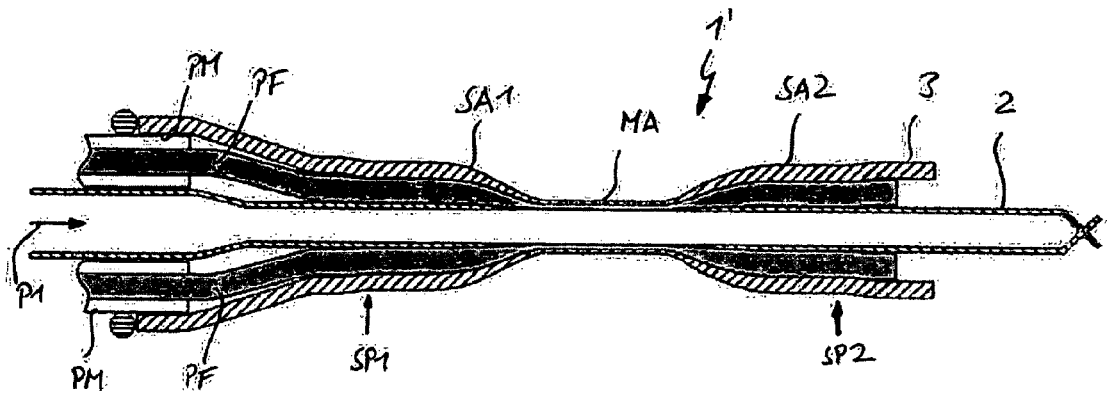

In the blank 1' of FIG. 8, complete fusing of the structure made of inner tube 2, pump fibers PF, and optionally outer tube 3 in the middle section MA and the sections SA1, SA2 adjoining on both sides can, but does not have to be, performed with increasing external diameter (e.g., up to the points SP1, SP2), during which cavities or air inclusions are removed at least from the middle section MA and optionally from the sections SA1, SA2 adjoining on both sides. Pressure is preferably also applied to the inner tube 2 during this step.

During the removal of the cavities or air inclusions, partial vacuum can optionally be used between inner and outer tubes 2, 3.

Figure 9:
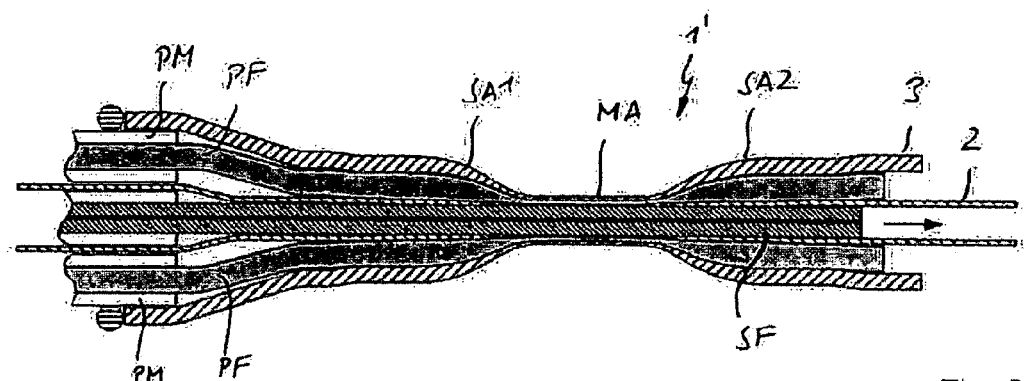

In the fiber coupler blank 1' according to FIG. 8, in a further step the signal fiber SF is inserted (FIG. 9). After the insertion of the signal fiber, the inner tube 2 is collapsed on the signal fiber SF at least in the area of the middle section MA and the adjoining side section SA1 (FIG. 9), in order to achieve a good optical contact between pump fibers PF and signal fiber SF. This collapsing of the inner tube 2 on the signal fiber SF can be performed, for example, by targeted heat action. In addition, partial vacuum can be applied to the inner tube 2.

The heat action described in the above steps can be achieved using greatly varying heat sources, such as $CO_2$ lasers, electrical arcs, or resistance heating.

Figure 10:
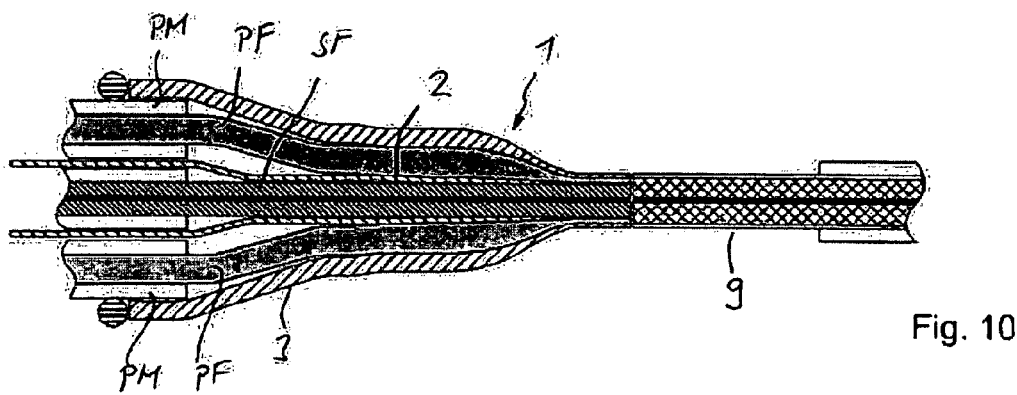
FIG. 10 shows the fiber coupler of FIG. 1 with spliced-on fiber 9.

The fiber coupler blank 1' of FIG. 9 is then severed in the middle section (e.g., by breaking or cutting), so that the fiber coupler 1 of FIG. 1 is obtained. The fiber coupler 1 thus obtained can also be spliced to a geometrically adapted fiber 9, as schematically shown in FIG. 10.

Figure 11:
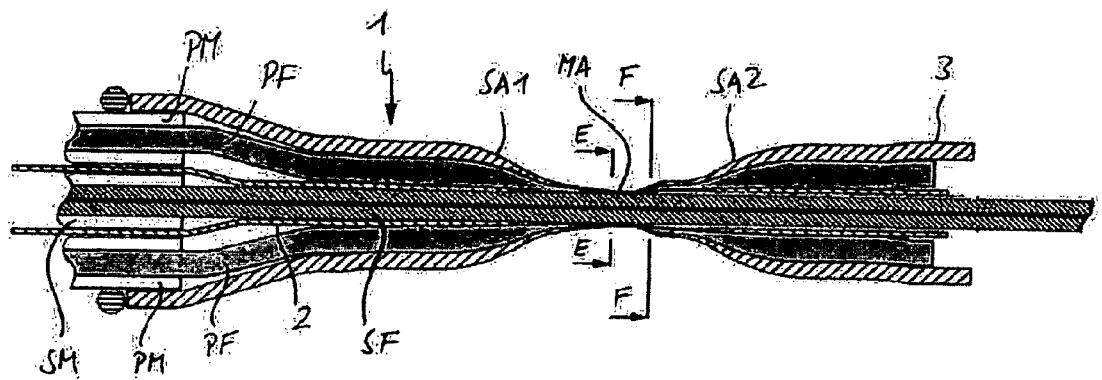
FIG. 11 shows a fiber coupler according to a second embodiment.
Figure 12:
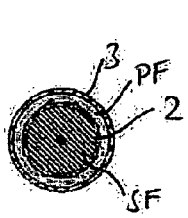
FIG. 12 shows the cross-section along line E-E of FIG. 11.
Figure 13:
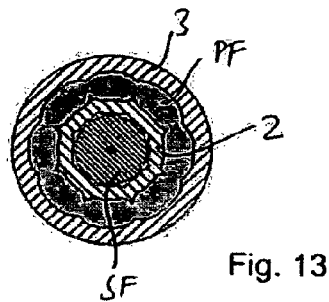
FIG. 13 shows the cross-section along line F-F of FIG. 11.

According to a further embodiment, the fiber coupler 1 shown in FIG. 11 can be produced essentially by steps 6 through 9. However, the heating to fuse the pump fibers PF with the inner tube 2 and the inner tube 2 with the inserted signal fiber SF is performed so that this fusing only occurs in the middle section MA and the adjoining side section SA1 on the left in FIG. 11. Thus, it is achieved that the optical contact between the inner tube 2 and the signal fiber SF only exists in the side section SA1 and the middle section MA. In the side section SA2 adjoining the middle section MA on the right, there is no optical contact between the inner tube 2 and the signal fiber SF. This may also be inferred from the cross-sectional views in FIGS. 12 and 13, which show the cross-section along section E-E or F-F, respectively. While in the cross-section of FIG. 12, there is a contact of the inner tube 2 with the signal fiber SF, there is no direct contact between inner tube 2 and signal fiber SF in the cross-section in FIG. 13. There is therefore no longer optical contact between the inner tube 2 and the signal fiber SF in the side section SA2. The fiber coupler 1 according to FIG. 11 can thus be used in the form shown in FIG. 11. A severing in the area of the middle section MA is not necessary.

Figure 14:
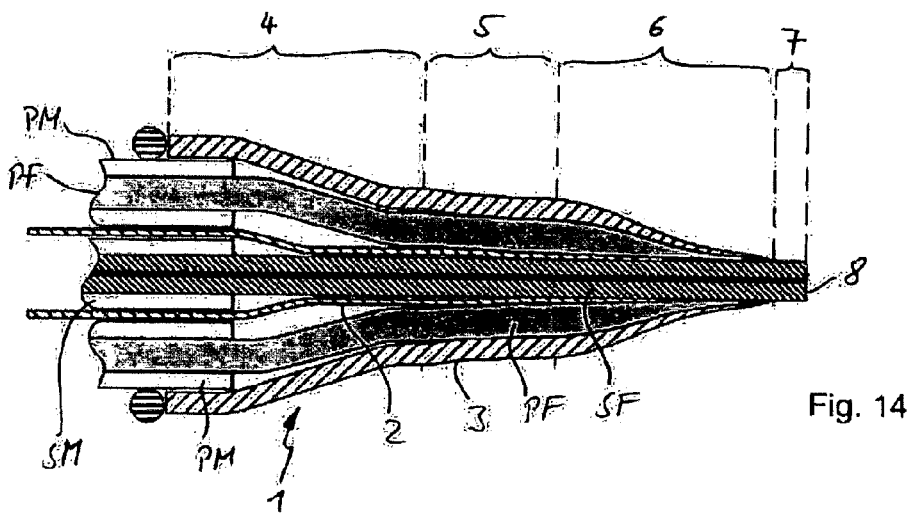
FIG. 14 shows a fiber coupler according to a third embodiment.

A further embodiment of the fiber coupler 1 according to the invention is shown in FIG. 14. The fiber coupler of FIG. 14 differs from the fiber coupler of FIG. 1 in the implementation of the terminal section 7. In the fiber coupler of FIG. 14, the terminal section 7 is implemented so that it is exclusively formed by the signal fiber SF itself. In the tapered section 6, the outer tube 3, the pump fibers PF, and the inner tube 2 are tapered until their thickness decreases to 0, so that only the signal fiber SF is still provided in the terminal section 7. However, it is further possible to cut off the exposed end of the signal fiber SF, so that the terminal section 7 is essentially formed in this case by the terminal face 8, which simultaneously forms the end of the tapered section 6 in this case.

Figure 15:
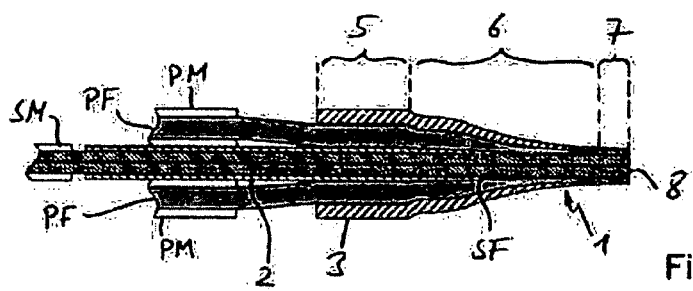
FIG. 15 shows a fiber coupler according to a fourth embodiment.
Figure 16:
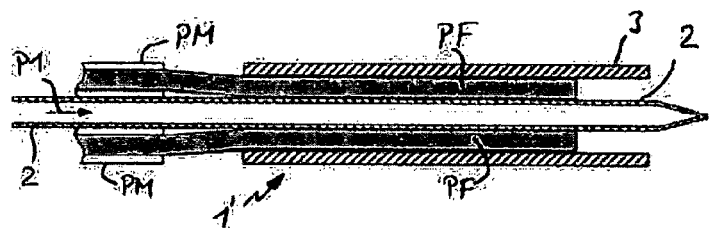
FIGS. 16-19 show steps for the production of the fiber coupler of FIG. 15.
Figure 17:
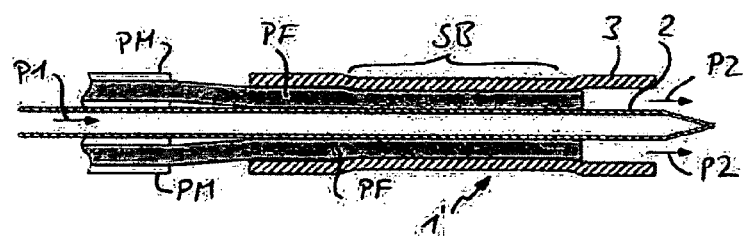
Figure 18:
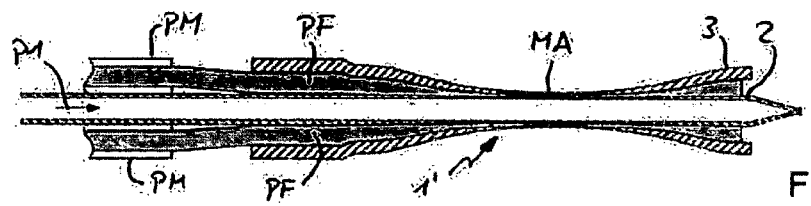
Figure 19:
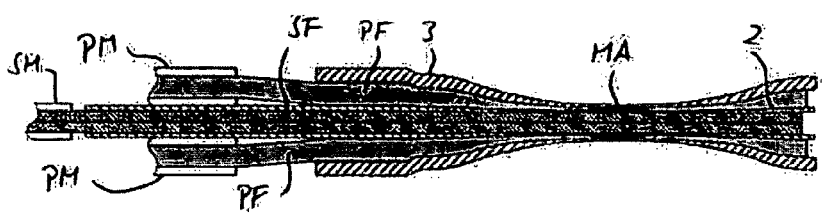

A fiber coupler according to a further embodiment is shown in FIG. 15, which differs from the fiber coupler of FIG. 1 essentially only in that it has no expansion to receive the pump fibers PF having cladding PM on its left open end. The fiber coupler 1 of FIG. 15 thus does not comprise a receptacle section 4, but rather already begins on its left side in FIG. 15 with the main section 5. In order that this is possible, the inner tube 2 is drawn out somewhat further to the left and the section of the pump fibers PF having the cladding PM is situated outside the outer tube 3 on the inner tube 2.

The production of the fiber coupler 1 according to FIG. 15 is shown in FIGS. 16 through 19, these steps essentially corresponding to the steps according to FIGS. 6 through 9, so that reference can be made to the statements on FIGS. 6 through 9.

It is possible to modify the described production method so that the inner fiber or signal fiber SF is not only inserted after the formation of the tapered middle section MA. Rather, according to the modification, a noticeable deformation of the fiber coupler blank 1' only occurs after insertion of the signal fiber SF.

The fiber coupler blank 1', which is provided for the insertion of the signal fiber SF, can be implemented differently.

For example, if the signal fiber SF is inserted directly after insertion of the pump fibers PF, a fiber coupler blank 1' is provided in which the individual components are not yet fused, so that cavities are still located in the later tapered area of the middle section between inner tube 2 and outer tube 3.

Before insertion of the signal fiber SF, the fiber coupler blank 1' can also already be partially or completely fused in the middle section MA, which is implemented as tapered in the following steps, so that no cavities still exist between the inner tube 2 and the outer tube 3 in the middle section MA.

With respect to the further production steps, a differentiation can be made as to whether a noticeable deformation of the fiber coupler blank only occurs before the inner tube 2 is fused to the signal fiber SF or if the inner tube 2 and the signal fiber SF are already partially fused.

In the first case, the tapering of the middle section is essentially terminated before the fusing, in the second case, a continuous method suggests itself, in which the collapsing and fusing of the inner tube 2 on the signal fiber SF is performed spatially trailing the deformation of the fiber coupler blank 1', to minimize the introduction of heat into the signal fiber and the deformation of the signal fiber SF. In the area not yet collapsed on the signal fiber SF, the deformation of the fiber coupler blank 1' can be performed by mechanical drawing and heat introduction independently of the deformation of the signal fiber SF. If the observed section is suitably deformed, the collapsing can be performed on the signal fiber SF.

Figure 20:
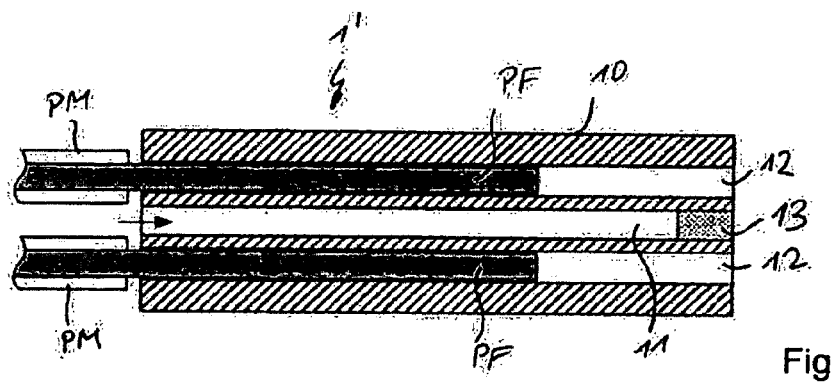
FIGS. 20-23 show steps for the production of a fiber coupler according to a further embodiment.

The production of a further embodiment of the fiber coupler 1 according to the invention is described in connection with FIGS. 20 through 25. A section through the carrier 10 of FIG. 20 is shown in FIG. 24, in the sectional illustration, only the carrier 10 itself without inserted fibers being shown. The carrier 10 has a circular cross-section having a central middle hole 11, which is used for receiving the signal fiber SF. The wall of the middle hole 11 thus forms the inner tube.

Six pump fiber holes 12 are provided distributed uniformly in the peripheral direction around the middle hole 11, which extend in the same way as the middle hole 11 over the entire length of the carrier 10. The material of the carrier 10 externally enclosing the pump fiber holes 12 thus forms the outer tube 3 of the fiber coupler.

In further implementations, of course, more or fewer than six pump fiber holes could also be provided.

As shown in FIG. 20, pump fibers PF (without pump fiber cladding PM) are inserted into the pump fiber holes 12. The diameter of the pump fiber holes 12 is selected so that the pump fibers PF may just be inserted. Furthermore, the right side of the middle hole 11 is closed by a stopper 13.

Figure 21:
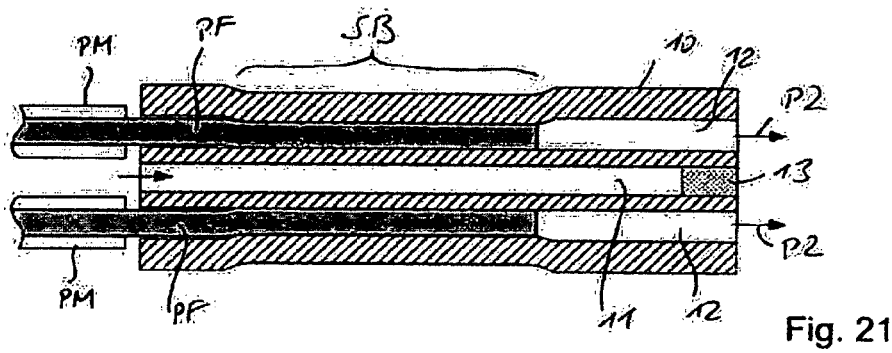

In the section shown in FIG. 21, the pump fibers PF are fused with the walls of the pump fiber holes 12 in the area SB.

Figure 22:
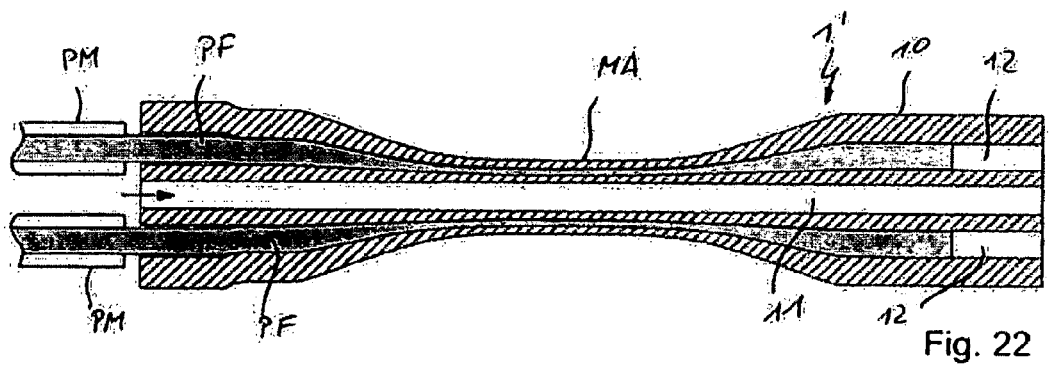

Partial vacuum (arrows P2) is applied to the pump fiber holes 12 from the right side, as shown in FIG. 21. The middle section of the fiber coupler blank 1' is heated simultaneously and pressure is applied to the middle hole 11 from its left open end (arrow P1), so that a tapering middle section MA is formed and the diameter of the middle hole 11 remains unchanged (FIG. 22).

The signal fiber SF is then inserted into the middle hole 11 and the wall of the middle hole 11 is collapsed on the signal fiber (FIG. 23), in order to achieve the desired optical contact between carrier 10 and signal fiber SF.

The collapse can be performed using heat action with or without partial vacuum. Upon good correspondence of the cross-sectional geometry of signal fiber SF and inner tube (or middle hole 11), the inner tube can be collapsed well on the signal fiber SF with little heat introduction. Partial vacuum is preferably used for this purpose, whereby greater cross-sectional differences may also be bridged. Greater cross-sectional area differences may also thus be bridged with little heat introduction.

Figure 23:
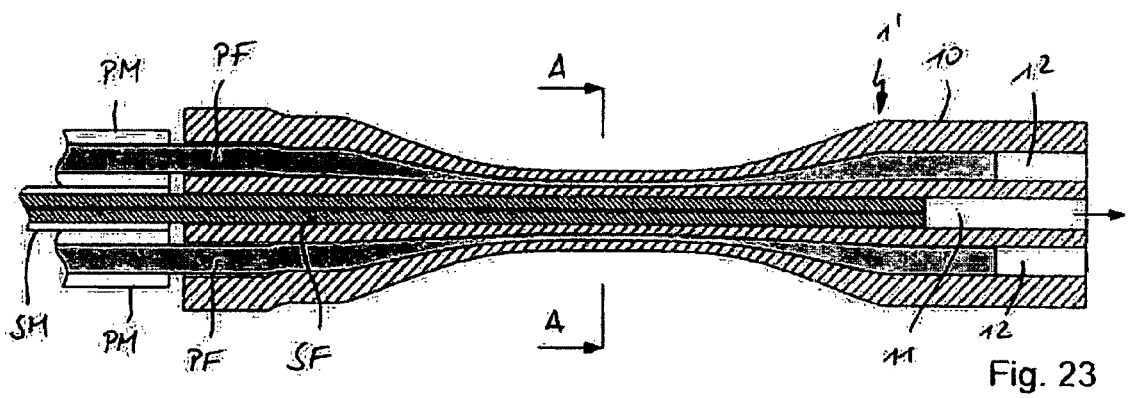
Figure 24:
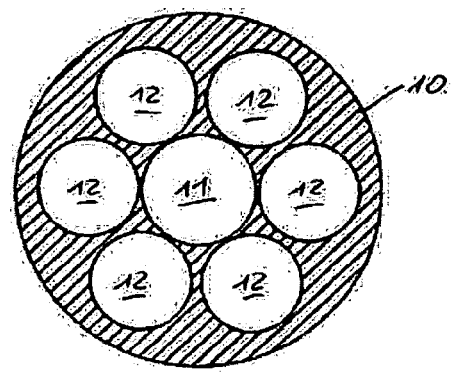
FIG. 24 shows a view of a carrier which is used in the steps of FIGS. 20-23.
Figure 25:
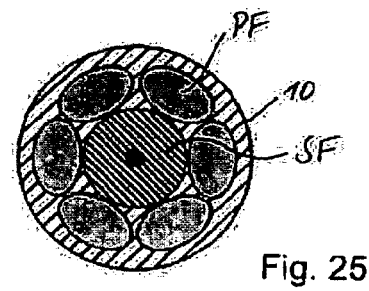
FIG. 25 shows a cross-section along line A-A in FIG. 23.
Figure 26:
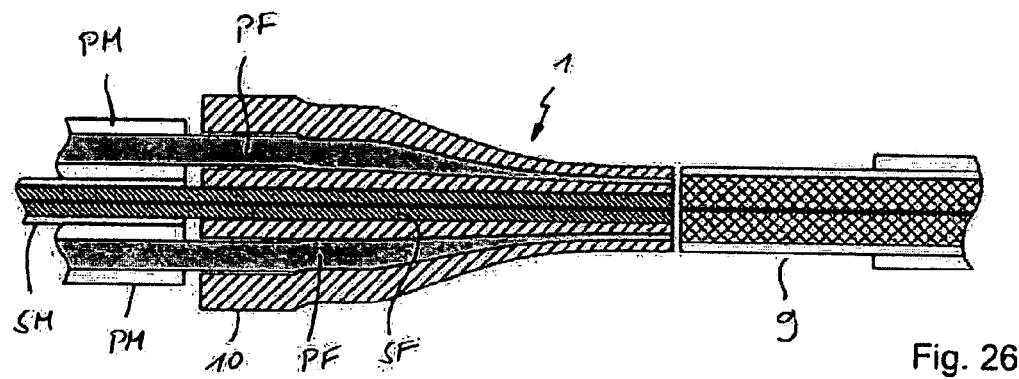
FIG. 26 shows a fiber coupler produced using steps 20-23.

Subsequently, the fiber coupler blank 1' of FIG. 23 is provided, whose cross-section along A-A is shown in FIG. 25. For example, the blank 1' can be severed at this sectional area A-A, in order to finish the desired fiber coupler 1, which is shown in FIG. 26. The fiber coupler 1 can be spliced with the fiber 9.

Using the carrier 10, in this embodiment, the location of the pump fibers PF and the pump fiber holes 12, and the centering of the inner hole 11 to the outer geometry of the carrier 10 are fixedly specified. This location specification together with the extensive form fit of the pump fibers PF makes it easier to maintain symmetry during the fusing and tapering of the fiber coupler blank 1', whereby maintaining the centering of the middle hole 11 and maintaining the cross-sectional geometry of the middle hole 11 can be made easier and/or ensured. The pump fibers PF and the outer tube (or the corresponding area of the carrier 10) are only restrictedly deformed, so that an undesired steepening of the divergence of the light conducted in the pump fibers PF can be restricted. Furthermore, the fusing can advantageously be performed with removal of the cavities in the case of limited heat introduction, even if no partial vacuum support is used.

Figure 27A:
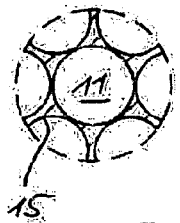
FIG. 27a-c show sectional illustrations of a two-piece carrier 10.
Figure 27B:
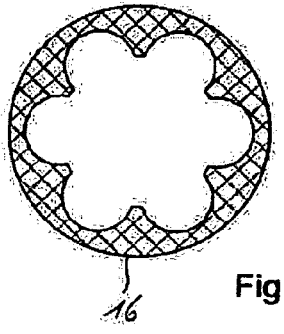
Figure 27C:
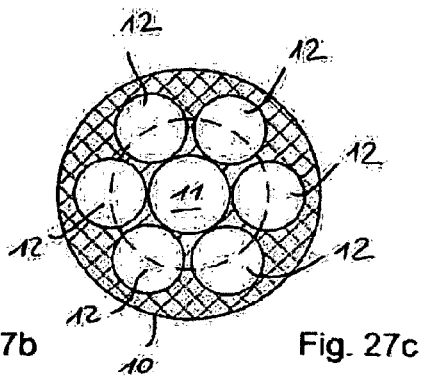

The carrier 10 can be in one piece. It is also possible to assemble the carrier 10 from an inner part 15 (FIG. 27a), which has the middle hole 11, and an outer part 16 (FIG. 27b), the inner and outer parts 15, 16 forming the pump fiber holes 12 in the assembled state (FIG. 27c) in addition to the middle hole 11.

Figure 28A:
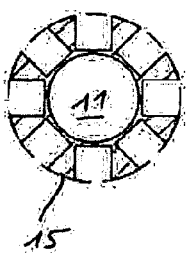
FIG. 28a-c show sectional illustrations of a further two-piece carrier 10.
Figure 28B:
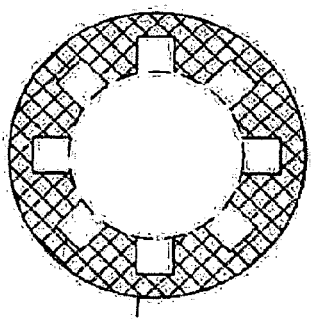
Figure 28C:
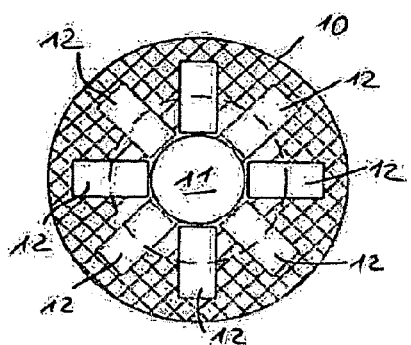

It is possible to adapt the pump fiber holes 12 to a different cross-section of the pump fibers. For example, if the cross-section is rectangular, inner and outer parts 15, 16 may be implemented as shown in FIGS. 28a-28c.

In the two-part implementation of the carrier, as described in connection with FIGS. 27a-27c and 28a-28c, the inner part 15 can be implemented in each case so that it is longer than the outer part 16, so that it protrudes beyond at least one end of the outer part 16. It is thus possible to apply pressure (overpressure or partial vacuum) to the middle hole 11, if desired. Furthermore, the guiding of the signal fiber SF and/or the pump fibers PF beyond the area of the outer part 16 can thus be made possible.

Figure 29:
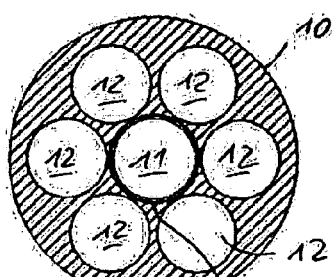
FIGS. 29-33 show various embodiments of the carrier of FIG. 24.

The same effect can be achieved in a one-part carrier 10 in that an inner tube 2 is inserted into the middle hole 11, as schematically shown in FIG. 29. The length of the inner tube 2 is selected so that it protrudes beyond the end of the carrier 10 at least at one end of the carrier 10.

Figure 30:
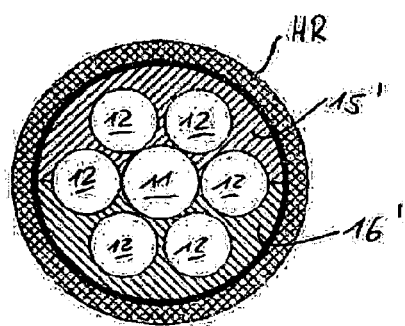

Another type of the division in two of the carrier is shown in FIG. 30. In this case, the carrier 10 has an upper part 15' and a lower part 16', which are each semicircular viewed in cross-section. Two pump fiber holes 12 are implemented completely and two pump fiber holes and the middle hole 11 lying between them are each only implemented in half in each of the two parts 15' and 16', so that the two parts 15' and 16' also form the middle hole 11 and the two adjacent pump fiber holes 12 only in the assembled state, which is shown in FIG. 30. The two parts 15' and 16' are fixed by a holding tube HR which encloses them.

The holding tube HR can have a reduced index of refraction on its inner side, for example, which is indicated here by the darker illustration. The reduction of the index of refraction of the inner side in comparison to the outer area (the part having greater radii) can be achieved, for example, by a fluorine doping.

During the production, the cladding SM can be removed from the signal fiber SF over the length which corresponds to the length of the two parts 15' and 16'. The signal fiber is then laid using its stripped section in the half middle hole of one of the two sections 15' and 16' and the other section 16' or 15', respectively, is placed on the section 15', 16' having the signal fiber SF. The holding tube HR is then pushed over these two parts 15' and 16' having the signal fiber SF in the middle hole 11. The pump fibers PF may be inserted into the pump fiber holes 12 before or after the holding tube is pushed over. The fiber coupler blank then provided can then be subjected to similar steps, for example, as were described in connection with FIGS. 22 and 23, in order to achieve a desired fiber coupler 1.

In this embodiment, the fiber coupler can be produced completely without a splicing action and one has a continuously active fiber on which a coupling site is introduced.

Figure 31:
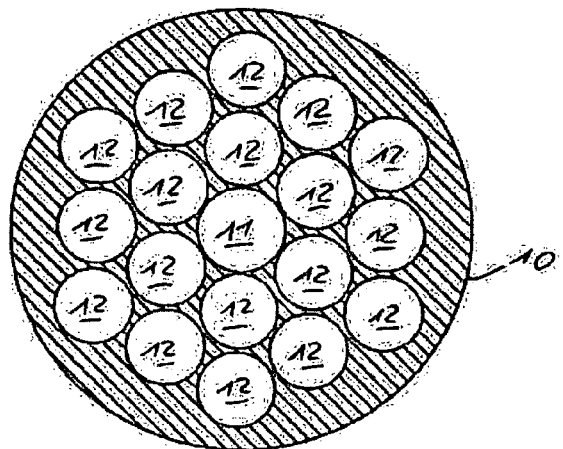

Of course, it is also possible to situate more pump fibers. An example of a carrier 10 is shown in FIG. 31, in which the middle hole 11 is enclosed by eighteen pump fiber holes 12, all holes having a circular cross-section. In this case, the signal fiber is enclosed by multiple "pump rings". The six pump fiber holes 12, which directly adjoin the middle hole 11, thus form a first ring. The pump fiber holes enclosing these six pump fiber holes form a second ring. The pump fibers in the corresponding pump fiber holes thus form a first (inner) "pump ring" and a second (outer) "pump ring" in the produced fiber coupler.

Figure 32:
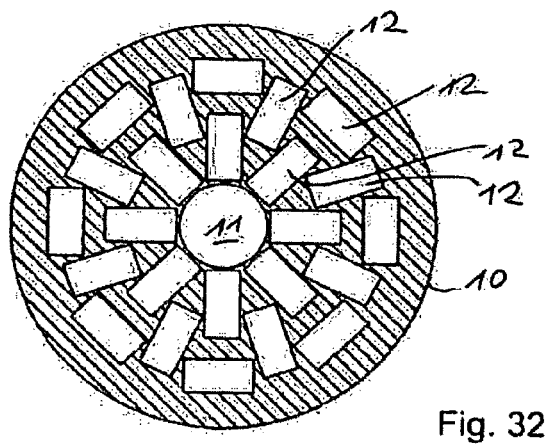

An example of a carrier is shown in FIG. 32, in which the middle hole 11 having circular cross-section is enclosed by twenty-four pump fiber holes 12 having rectangular cross-section.

Figure 33:
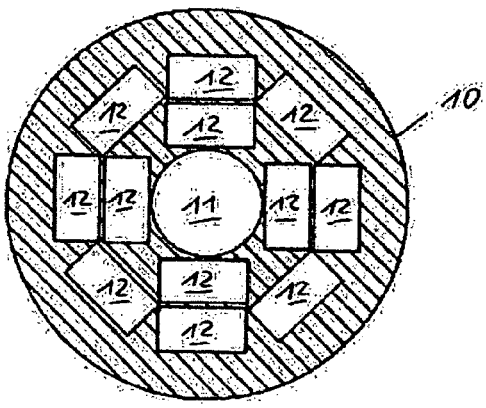

A variant is shown in FIG. 33, in which the carrier has the middle hole 11 having circular cross-section, which is enclosed by twelve pump fiber holes 12, which each have a rectangular cross-section.

Figure 49:
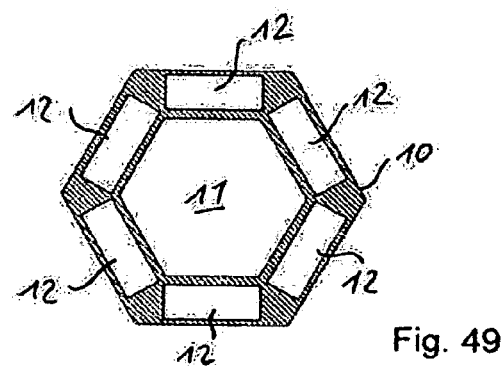
FIG. 49 shows a sectional view of a further embodiment of the carrier 10.

In the variant shown in FIG. 49, the carrier 10 has a hexagonal structure of the periphery of the cross-section and the middle hole 11 is also hexagonal. The hexagonal middle hole 11 is enclosed by six rectangular pump fiber holes 12.

Figure 34:
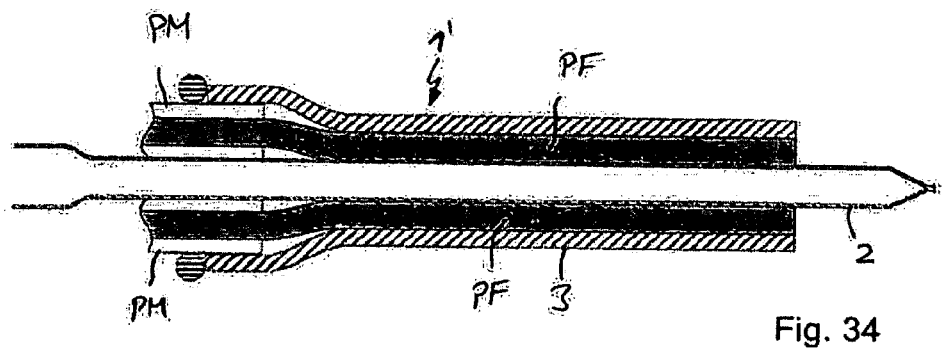
FIGS. 34 and 35 show steps for the production of a further fiber coupler.
Figure 35:
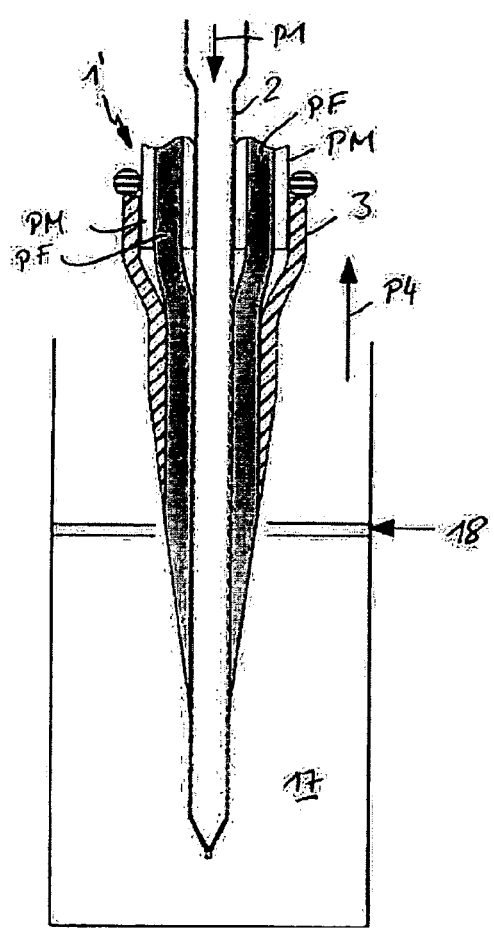
Figure 36:
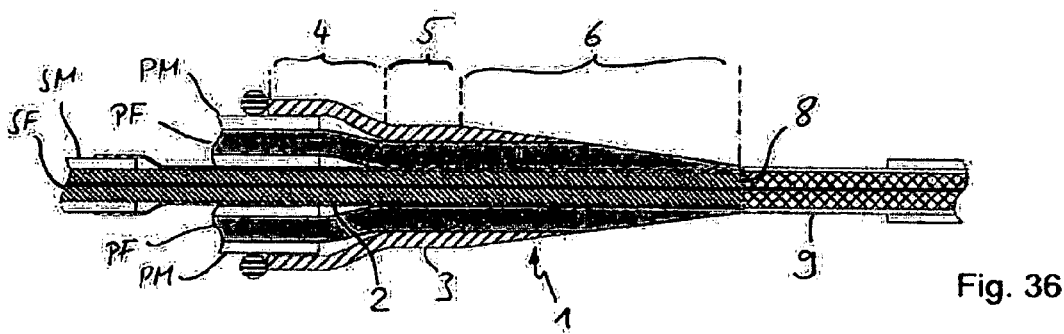
FIG. 36 shows the further fiber coupler produced using the steps of FIGS. 34 and 35.

A further embodiment of the fiber coupler according to the invention is described in connection with FIGS. 34 to 36. Firstly, a fiber coupler blank 1' is produced (FIG. 34). The fiber coupler blank 1' is then immersed in a bath 17 of hydrofluoric acid (HF) and drawn upward (arrow P4) out of the bath 17 (FIG. 35). Because the sections of the fiber coupler blank 1' lying further below thus remain longer in the hydrofluoric acid than the sections lying further above, the material erosion is greater in the sections lying further below, so that the wedge-shaped form of the fiber coupler blank 1' indicated in FIG. 35 results. A paraffin layer 18 is preferably applied to the surface of the hydrofluoric acid bath, which ensures that the hydrofluoric acid is completely stripped off when the fiber coupler blank 1' is pulled out. During the withdrawal, pressure can be applied to the inner tube (P1) or the inner tube can also be closed, in order to ensure that the internal diameter of the inner tube is not decreased.

The signal fiber SF is then inserted into the fiber coupler blank 1' and the inner tube 2 is collapsed onto the signal fiber SF. The front end 8, which can be spliced onto a geometrically adapted fiber 9 (FIG. 36), is then formed by severing.

The signal fiber can also be inserted beforehand (as before the tapered section according to FIG. 35) in this example. In addition, the tapering does not have to be performed at the end, the terminal section may also be provided in the course of the process at another site.

In this embodiment, the tapered section 6 is created, in contrast to the previous embodiments, by material erosion. Furthermore, the tapered section extends to the front end 8 or to the forward front side of the fiber coupler 1, so that the front end 8 also simultaneously forms the terminal section of the fiber coupler 1.

Figure 37:
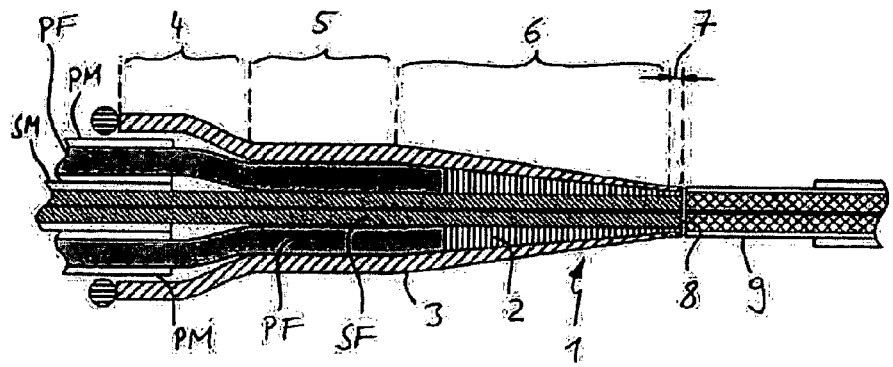
FIG. 37 shows a fiber coupler according to a further embodiment.

In the further embodiment of the fiber coupler 1 shown in FIG. 37, the inner tube 2 does not extend along the entire fiber coupler 1, in contrast to the embodiments of the fiber coupler 1 described up to this point, but rather only beginning in the tapered section 6 and along the terminal section 7, the internal diameter of the inner tube 2 remaining constant, but the external diameter of the inner tube 2 and thus the wall thickness of the inner tube 2 decreasing along the tapered section 6.

The tapering inner tube 2 is collapsed on the signal fiber SF and the front ends of the pump fibers PF press flatly against the left front side 20 of the inner tube 2, in order to ensure a good optical contact between pump fibers PF and inner tube 2.

Such a fiber coupler 1 can again be spliced on a geometrically adapted fiber 9, as indicated in FIG. 37.

The production of the fiber coupler 1 of FIG. 37 is described in connection with FIGS. 38 and 39.

Figure 38:
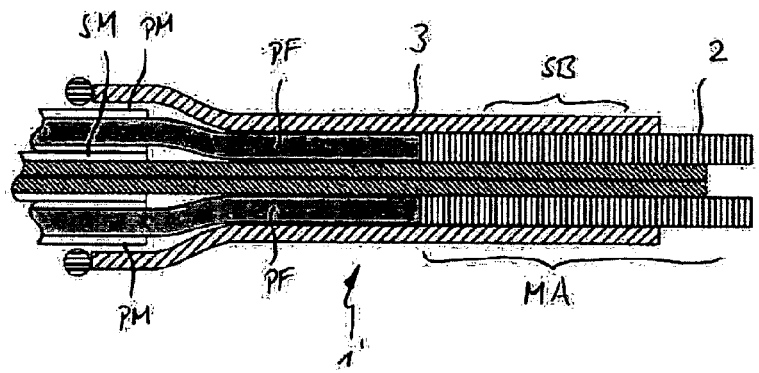
FIGS. 38 and 39 show steps for the production of the fiber coupler of FIG. 37.

As shown in FIG. 38, the inner tube 2 is only partially inserted from the right side into the outer tube 3 in FIG. 38. From the left side, eight pump fibers PF are inserted so that their front ends 21 press flatly against the front side 20 of the inner tube 2. The wall thickness of the inner tube 2 is selected here so that it corresponds to the diameter of the pump fibers PF, so that a middle channel, which can just receive the signal fiber SF, is provided in the area of the middle section MA of the blank 1'.

The outer tube 3 is fused with the inner tube 2 in the area SB. No connection exists in each case between inner tube 2 and signal fiber SF and between the pump fibers PF and the signal fiber SF.

Figure 39:
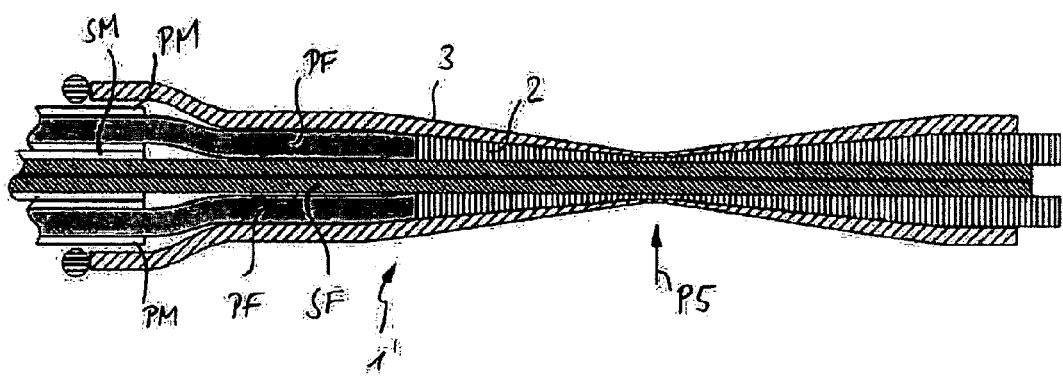

In the step from FIG. 38 to FIG. 39, the blank 1' is tapered so that the internal diameter of the inner tube 2 remains constant, as shown in FIG. 39. This can be performed, for example, by drawing of outer tube 3 and inner tube 2 and simultaneously introducing heat. Because the signal fiber SF is not connected to the inner tube 2, it is not tapered during this tapering. The inner tube 2 is then collapsed on the signal fiber SF in order to achieve the desired optical contact, and the fiber coupler blank 1' is severed or broken at the point shown by the arrow P5, for example, to form the front end 8.

The front end 8 can then, as indicated in FIG. 37, be spliced on a geometrically adapted fiber 9.

Of course, it is also possible to only insert the signal fiber SF and/or the pump fibers PF into the blank 1' after the tapering step of FIG. 38 to FIG. 39, and then to collapse the inner tube 2 on the signal fiber SF. An additional continuous inner tube is to be provided for this purpose, similarly as in the other exemplary embodiments.

Figure 40:
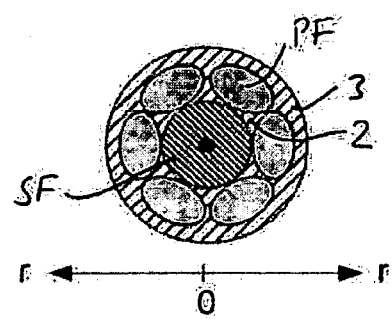
FIG. 40 shows a top view of the terminal face 8 of the terminal section 7 of the fiber coupler of FIG. 37.
Figure 41:
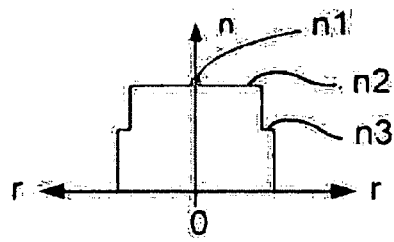
FIGS. 41-43 show various index of refraction curves of the terminal face 8 of FIG. 40.
Figure 42:
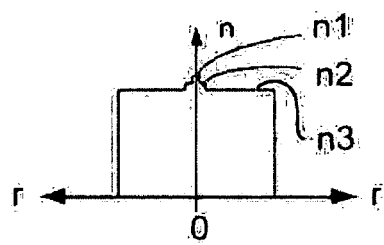
Figure 43:
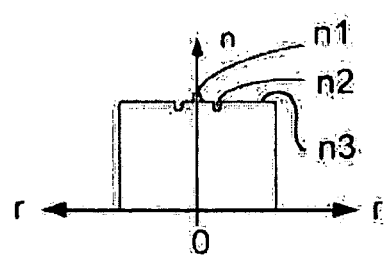

The end 8 of an embodiment of the fiber coupler according to the invention is shown in FIG. 40. Various possible index of refraction curves in the radial direction of the end 8 of the fiber coupler 1 are shown in FIGS. 41 to 43. These index of refraction curves preferably extend in the axial direction over the terminal section 7 and the tapered section 6 of the fiber coupler 1, the radial positions of the index of refraction jumps shifting, because the signal fiber SF does not taper, in contrast to the remaining structure.

In the index of refraction curve of FIG. 41, the index of refraction n1 of the signal core of the signal fiber SF is the highest. The indices of refraction of the remaining signal fiber SF, the inner tube 2, and the pump fibers PF are equal (n2) and less than n1. The index of refraction n3 of the outer tube 3 is in turn less than the index of refraction n2. However, it is also possible that in the variant of FIG. 41, in an alteration, n2 and n3 are equally great.

In the variant of FIG. 42, the signal fiber SF has a so-called index of refraction pedestal having an index of refraction n2 which is less than the index of refraction n1 of the signal core of the signal fiber SF and is greater than the index of refraction of outer tube 3, inner tube 2, and pump fibers PF, which have equal index of refraction n3 or a similar index of refraction.

A variant is shown in FIG. 43, in which an inner tube 2 having a low index of refraction is used, so that the index of refraction n2 of the inner tube is less than the index of refraction n3 of the outer tube 3 and the pump fibers PF. Furthermore, the signal fiber SF also has the index of refraction n3 beside its signal core. The signal core has a greater index of refraction n1. This index of refraction ring of the inner tube 2 is used in particular so that parasitic signal light in the signal fiber SF is guided out of the coupling area (terminal section 7 and tapered section 6) to protect pump sources (not shown), and the parasitic signal light is thus prevented from reaching the pump sources via the pump fibers PF. The same function is achieved using the index of refraction curve of FIG. 42. Of course, the radial index of refraction curve of a fiber to be spliced on the end 8 can be adapted accordingly.

Various designs of the receptacle section 4 of the fiber coupler 1 are shown in FIGS. 44 through 47.

Figure 44:
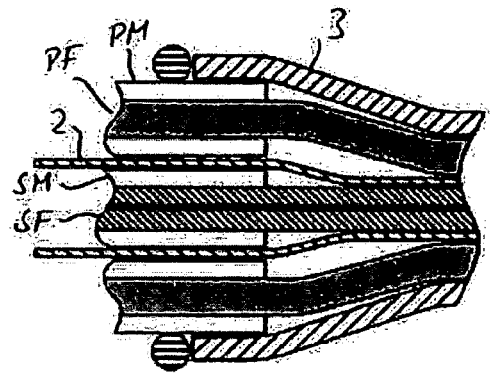
FIGS. 44-47 show various formations of the receptacle section 4 of the fiber coupler according to the invention.

The design of FIG. 44 is a design corresponding to the embodiment of FIG. 1. Pump fibers PF and signal fiber SF each have their cladding PM or SM, respectively, at the beginning of the receptacle section 4 here.

Figure 45:
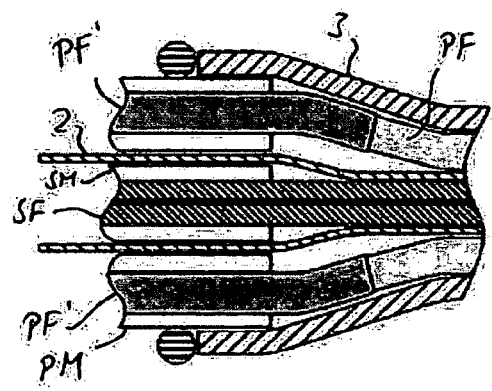

An example is shown in FIG. 45, in which the subsequently tapered pump fibers PF end in the receptacle section 4 and are connected to supply fibers PF', which in turn have cladding PM'. In particular, the pump fiber PF and supply fiber PF' may be spliced.

Figure 46:
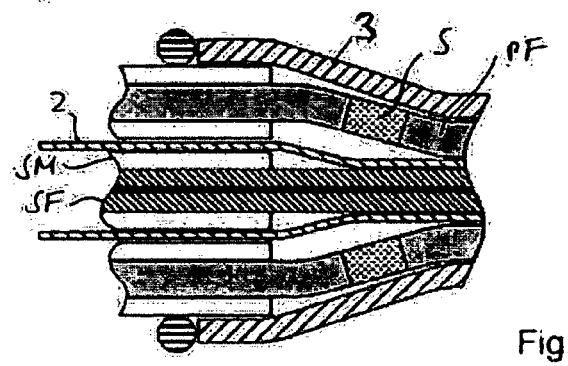

In the example of FIG. 46, at least one section MS of the pump fibers PF is implemented as a so-called mode stripper S. In this way, light running in an undesired manner from right to left in the direction to the pump sources (not shown) is coupled out from the material of the pump fibers, so that it is not continued and does not result in damage or impairment at another point. The mode stripper typically acts on the light of pump fibers or inner fibers conducted in the cladding made of glass material.

Figure 47:
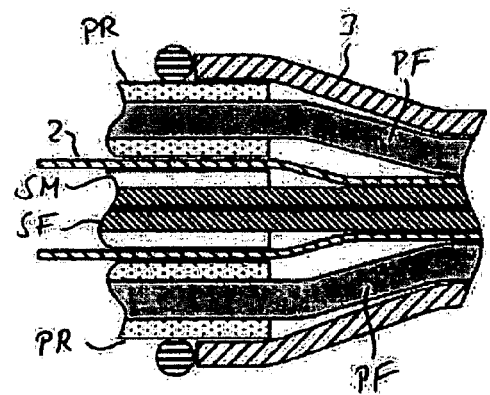

An example is shown in FIG. 47, in which the pump fibers PF no longer have cladding PM, but rather only still have an outer ring PR doped with fluorine.

Figure 50:
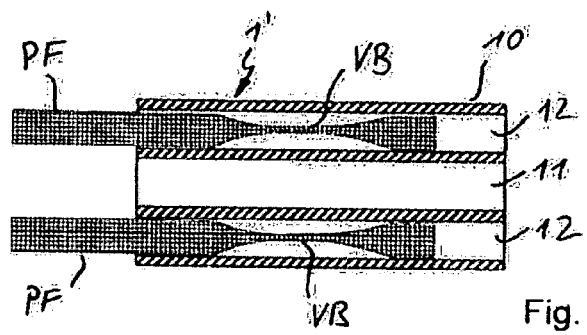
FIGS. 50 and 51 show steps for the production of a fiber coupler according to a further embodiment.
Figure 51:
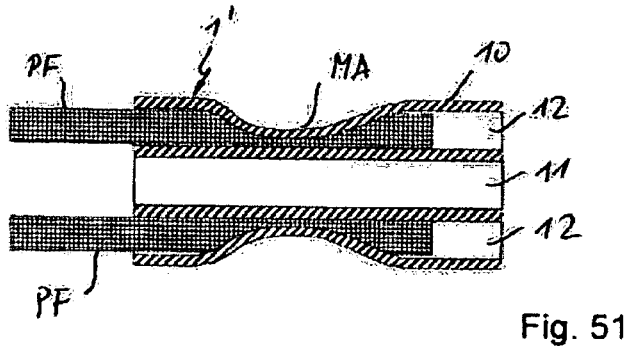

A fiber coupler blank 1' is shown in each of FIGS. 50 and 51, which can be used to produce a fiber coupler according to the invention. The illustrations in FIGS. 50 and 51 essentially correspond to the illustrations of FIGS. 20 and 22, however, in contrast to the illustrations of FIGS. 20 and 22, the pump fibers PF each comprising a tapered area VB, in which they are themselves implemented as already tapered. The tapered areas VB of the pump fibers PF are preferably oriented so that they are in the area of the tapered section to be formed, as shown in FIG. 51.

In the step from FIG. 50 to FIG. 51, the tapering of the outer tube can be performed exclusively by heat action, for example. Drawing can be dispensed with. However, it is also possible to additionally perform mechanical drawing.

The pump fibers can also have a tapered area VB in all above-described embodiments.

Furthermore, it is possible that the pump fibers PF and/or the signal fiber SF are each chamfered on their front end, using which they are inserted into the inner or outer tube. The front end can also be pointed or tapered itself.

In the description up to this point, it was always assumed that the signal light is conducted in the signal fiber SF in the direction of the tapering of the tapered section 6. Of course, it is also possible to use the fiber coupler according to the invention so that the signal light is conducted in the opposing direction. It is also possible that light is overcoupled from the signal fiber SF into the pump fibers SF and not, as previously described, from the pump fibers PF into the signal fiber SF.

Furthermore, it was previously assumed that the signal fiber SF typically ends in the terminal section 8. However, it is also possible to implement the fiber coupler 1 according to the invention so that the signal fiber SF extends beyond the terminal section 7.

The fiber coupler or its end 8 cannot only be spliced with a further fiber, as previously described, but rather any other type of optical coupling is also possible. In particular, free beam coupling is possible. Furthermore, the signal fiber can extend beyond the terminal section 7.

The described applications of pressure for the production of the individual embodiments make the production process easier. Thus, for example, an overpressure can be used in the inner tube and/or between inner and outer tubes to form the expansion in the receptacle section 4. An overpressure in the inner tube can be used during the deformation of the pump fibers PF and optionally the outer tube 3 to control the internal cross-section of the inner tube 2.

Partial vacuum can be used between the inner tube and the outer tube 2, 3, for example, in order to remove air inclusions in the structure made of pump fibers, outer tube, and inner tube.

In embodiments in which an extensive form fit exists between inner tube 2 and signal fiber SF, a collapse of the inner tube 2 and fusing thereof with the signal fiber SF can be achieved using moderate heat introduction into the inner tube 2. To further reduce the heat introduction, partial vacuum can be applied in the gap between inner tube 2 and signal fiber SF. The application of the partial vacuum between inner tube 2 and signal fiber SF further allows bridging of larger gaps and deviating geometry of signal fiber SF and inner tube 2.

To simplify the pressure application (overpressure or partial vacuum), the corresponding tube (inner or outer tube 2, 3) can be lengthened, so that the practical feasibility is made easier.

The cladding of the signal fiber SF, the pump fibers PF, and optionally the supply fibers PF' can be implemented as polymer cladding, acrylic cladding, nylon cladding, silicone cladding, as cladding made of glass material, or as an arbitrary combination of the listed materials.

The conduction of the light in the pump fibers PF can be achieved by the index of refraction of the cladding, which is reduced in relation to the index of refraction of the pump fibers (in the case of inner fibers of the pump core), or by enclosed cavities (a so-called air cladding, also referred to as air clad).

In the main section, the tapered section, and the terminal section, any polymer cladding of the signal fiber SF or the pump fibers PF is preferably completely removed. In these sections, it is advantageous, to achieve higher brilliance of the pump light in the terminal section 7, to use a signal fiber SF and/or pump fibers PF without cladding or with only thin cladding made of glass material.

Furthermore, it is possible to use pump fibers PF in which not only is any cladding avoided in the later tapered area, but rather the pump fibers were already tapered beforehand.

The receptacle section 4 can receive the pump fibers PF and the signal fiber SF with or without cladding PM, SM. Preferably, any cladding is removed in the tapered section 6 and the terminal section 7.

The receptacle section 4 can be sealed in the fiber coupler according to the invention, in order to be able to build up pressure differentials during the production process, for example, and/or to prevent contamination in the interior of the structure during the production process or during the later use of the fiber coupler according to the invention.

Furthermore, a so-called mode stripper can be used on or in the cladding of the supplied fibers (preferably pump fibers PF), which dissipates light from the cladding in a targeted manner and thus prevents damage by this light in the further course of things. The mode stripper is preferably situated in the receptacle section 4.

The receptacle section 4 can preferably be implemented so that the conduction of the light in the pump fibers PF by total reflection is also ensured in sections having completely removed cladding, but in which overcoupling still does not occur into the inner tube 2, into the outer tube 3, or the carrier 10, in that undesired contact of the outer surfaces of the fibers with other components is prevented. This is also true for the signal fiber in sections having completely removed cladding. Any undesired contact with the inner tube is then avoided in the receptacle section 4.

The correspondence of the cross-sectional geometry between inner tube 2 and signal fiber SF in the tapered section 6 and terminal section 7 is advantageous in particular for the process of the collapsing of the inner tube 2 on the signal fiber SF. A form fit of the inner tube 2 with the pump fibers PF and/or a local fixing of the pump fibers PF relative to the inner tube 2 is also advantageous, because this encourages the maintenance of the cross-sectional geometry of the inner tube 2 during fusing with the outer fibers PF.

A preparation of the terminal faces (breaking and/or polishing) is simplified by the outer tube 3 or the structure 10 and better splicing capability can advantageously be achieved.

The reduced index of refraction in the outer tube 3 can be used for the purpose of preventing the overcoupling of the pump light into the outer tube 3 or at least reducing it. The brilliance of the pump light in the terminal section 7 may thus be improved. Furthermore, outer tubes 3 of greater wall thickness may be used without brilliance loss.

In the same way, in the case of a two-part carrier 10, the outer part can be implemented having reduced index of refraction or a carrier 10 having a reduced index of refraction in the outer area can be used.

Figure 48:
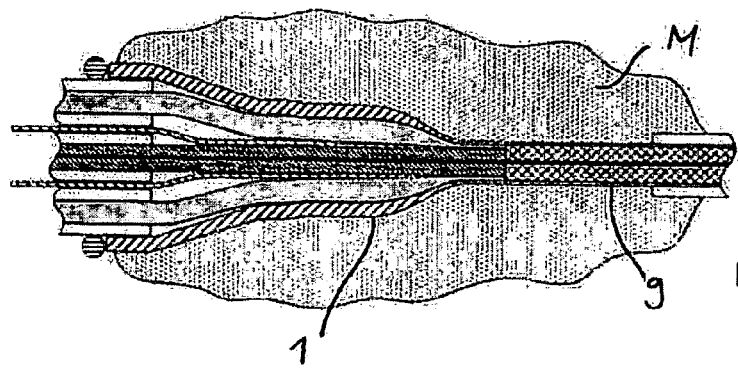
FIG. 48 shows the fiber coupler according to the invention with surrounding medium.

In the fiber coupler according to the invention, the outer tube 3 can be implemented so that it also conducts light of the pump fibers PF. For this purpose, the outer tube can have a reduced index of refraction, for example. It is also possible to provide a suitable index of refraction curve in the radial direction in the outer tube. Furthermore, the index of refraction of the medium M enclosing the outer tube, as schematically shown in FIG. 48, can be selected accordingly.

The receptacle section 4 of the fiber coupler 1 according to the invention can be implemented in such a manner, for example, that the conduction of the pump light in the pump fibers by total reflection is also ensured in sections having completely reduced cladding, but in which overcoupling into the inner tube, into the outer tube, or the carrier still does not occur, in that undesired contact of the outer surface to other components is prevented.

Furthermore, the receptacle section or its open ends can be encapsulated in relation to the outer side, so that the contamination risk is reduced.

The receptacle section improves the mechanical stability of the fiber coupler in particular if the fibers are received with cladding.

Because of the receptacle section, the entire structure of the fiber coupler can be simplified as a whole. These advantages also apply, of course, for a receptacle section which is implemented on the side of the terminal section of the fiber coupler, as is the case in the embodiment of FIG. 11, for example.

The outer tube can have a reduced index of refraction in comparison to the pump fibers. Furthermore, an outer tube having air cladding (=a plurality of air or gas bubbles are enclosed in the cladding of the outer tube to influence the index of refraction) can be used.

In the fiber coupler according to the invention, the signal fiber is preferably not tapered in the tapered section, however, a good fusion being achieved simultaneously, without strong heating of the signal fiber being required for this purpose. The mode profile of the signal of the signal fiber can thus be maintained, the mode cross-section also preferably being able to be maintained.

It is further possible to integrate further functions in the fiber coupler according to the invention, so that the number of the individual components can be reduced further. This is favored in particular by the support function of the coupler, which may be expanded by the receptacle section.

Using the fiber coupler according to the invention, for example, the mode cross-section in the coupler can be scaled and a mode field adaptation can be performed.

The signal fiber of the fiber coupler can be assembled from multiple individual fibers coupled by splicing.

Furthermore, the integration of mode converters and/or filters in the signal fiber and/or the pump fibers is possible.

Through the structure of the fiber coupler according to the invention and/or the fiber coupler blank in the production method according to the invention, centering of the pump and/or outer fibers and securing of the geometry are advantageously achieved, without complex auxiliary devices being required for this purpose.

In the production method, it is advantageous if the inner tube and/or the outer tube have a closed structure at least in the tapered section and optionally in the terminal section, because then pressure differences between inner and outer tubes can be built up during the production, which make it easier to collapse the inner tube on the signal fiber, for sample.

Furthermore, in the fiber coupler according to the invention, after the collapsing of the inner tube on the inner or signal fiber and fusing of inner tube and signal or inner fiber, the inner and/or outer tube can be entirely or partially etched away. This can provide advantages in the brilliance of the coupled-in pump power.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A fiber coupler, comprising:
   an inner tube;
   an inner fiber disposed in the inner tube;
   multiple outer fibers disposed around the inner fiber, and
   a main section;
   a terminal section; and
   a tapering section defined between the main section and the terminal section,
   wherein the fiber coupler tapers in the longitudinal direction of the inner fiber along the tapering section and the internal cross-section of the inner tube along the tapering section corresponds to the cross-section of the inner fiber,
   wherein the outer fibers are in optical contact with the inner fiber via the inner tube along the entire tapering section.

2. The fiber coupler according to claim 1, wherein the internal cross-section of the inner tube remains equal along the tapering section.

3. The fiber coupler according to claim 1, wherein the inner tube is collapsed on the inner fiber along the tapering section.

4. The fiber coupler according to claim 1, wherein the inner tube is in direct optical contact with the inner fiber along the entire tapering section.

5. The fiber coupler according to claim 1, wherein the outer fibers extend along the entire tapering section and their cross-sectional area decreases accordingly.

6. The fiber coupler according to claim 1, wherein the inner tube defines a wall thickness, and wherein the outer fibers extend up to the inner tube, are optically coupled to a front side of the inner tube, and the wall thickness of the inner tube decreases along the tapering section.

7. The fiber coupler according to claim 1, further comprising an outer tube in which the inner tube is at least partially situated and in which the outer fibers at least partially extend.

8. The fiber coupler according to claim 7, wherein the outer fibers extend between the outer tube and the inner tube.

9. The fiber coupler according to claim 7, wherein the outer tube defines an outer tube thickness and the wall thickness of the outer tube decreases along the tapering section.

10. The fiber coupler according to claim 7, wherein the outer tube extends along the entire tapering section.

11. A method for producing a fiber coupler, comprising:
    creating a blank, comprising providing multiple outer fibers and an inner tube defining an internal cross-section, the multiple outer fibers are situated around the inner tube, a portion of the blank being tapered along a longitudinal direction of the inner tube to define a tapered section having a longitudinal length, the tapered section connecting a main section of the blank to a terminal section of the blank, and forming the tapered section;
    inserting an inner fiber into the inner tube, wherein after the tapering step, an internal cross-section of the inner tube along the tapered section corresponds to the cross-section of the inserted inner fiber; and
    collapsing the inner tube on the inner fiber along the entire longitudinal length of the tapered section.

12. The method according to claim 11, wherein the internal cross-section of the inner tube remains unchanged during the tapering step.

13. The method according to claim 11, further comprising pressing the outer fibers against a front side of the inner tube.

14. The method according to claim 13, wherein step of inserting an inner fiber into the inner tube is executed before the tapering step and the collapsing of the inner tube is executed simultaneously with and spatially trailing the tapering step.

15. The method according to claim 11, wherein the outer fibers are inserted between the inner tube and an outer tube, which at least partially encloses the blank in the longitudinal direction.

16. The method according to claim 15, wherein the outer tube includes a closed internal cross-section to receive the inner fiber in the area of the tapered section to be created in the tapering step.

17. The method according to claim 11, wherein the wall thickness of the inner tube is decreased along the tapered section in the tapering step.

18. The method according to claim 11, wherein the tapering of the blank in the tapering step is caused by material deformation.

19. The method according to claim 11, wherein the tapering of the blank in the tapering step is caused by material erosion.

20. The method according to claim 11, wherein the outer fibers are used in the provision step, which are already tapered in the area of the tapered section to be created in the tapering step.

21. The method according to claim 11, wherein the inner tube used in the provision step has a closed internal cross-section for receiving the inner fiber in the area of the tapered section to be created in the tapering step.

22. The method according to claim 11, wherein partial vacuum is used in the tapering step for the tapering.

* * * * *